June 25, 1968  W. I. PRESSLEY, SR  3,389,765
CAM TYPE ROPE CLAMP
Filed Oct. 18, 1965

*INVENTOR.*
WILLIAM I. PRESSLEY, SR.

United States Patent Office 3,389,765
Patented June 25, 1968

3,389,765
CAM TYPE ROPE CLAMP
William I. Pressley, Sr., 8375 Elati St.,
Adams County, Colo.
Filed Oct. 18, 1965, Ser. No. 497,315
4 Claims. (Cl. 188—65.5)

ABSTRACT OF THE DISCLOSURE

A mechanical safety device comprised of a pair of parallel posts connected by side rails and an eccentrically-mounted cam pivotably mounted between the side rails intermediate the pair of posts. The cam has an attached control lever permitting an operator to control its eccentric motion and selectively close the space between cam and one post. The device is adapted to be used with nonmetal rope to facilitate either descent or ascent when used singly or in pairs respectively. The eccentric cam is spring biased towards a clamping direction and attachment means are provided.

---

Figure 2:
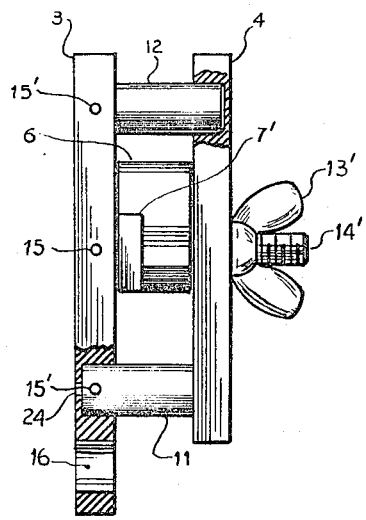
FIGURES 2 and 4 show a plan view and side view (with a side rail removed) of a second embodiment of my mechanical safety device for accepting one rope.
Figure 4:
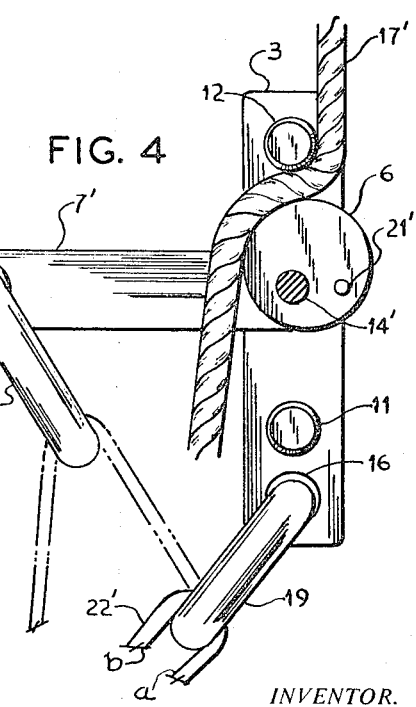

The second embodiment illustrated in FIGURES 2 and 4 has many parts identical or similar to parts of the first embodiment which bear the same reference numeral with a prime suffix added.

Figure 1:
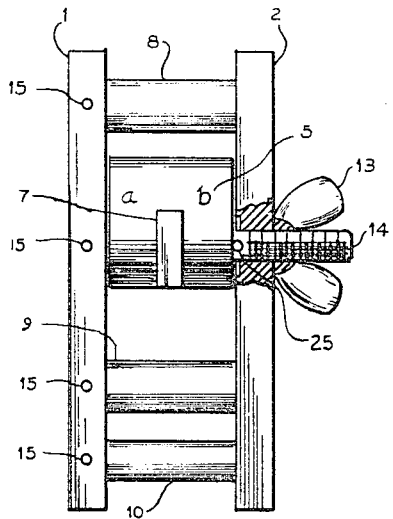
FIGURES 1 and 3 show a plan view and side view (with a side rail removed) respectively of a first embodiment of my mechanical safety device capable of accepting two ropes.

In FIGURE 1, posts 8, 9, 10 and stud 14 are set into blind holes of side rail 1 and secured into place with pins 15. These connections are similar to the connection of post 11 with side rail 3 shown in partial broken away section in the FIGURE 2 embodiment.

Posts 8, 9 and 10 of FIGURE 1 are set into blind holes of side 2 and posts 11 and 12 of FIGURE 2 are set into blind holes of side 4.

In FIGURE 1, stud 14 passes through a hole in side 2 and in FIGURE 2, stud 14' passes through hole in side 4. Shown in both FIGURES 1 and 2, wing nuts 13 and 13' are turned onto stud 14 and 14' to hold sides 2 and 4 respectively, in place.

Cam 5, FIGURE 1, is held in place by pin 25. Cam 6 of the FIGURE 2 embodiment is similarly retained by a connecting pin, not shown.

Figure 3:
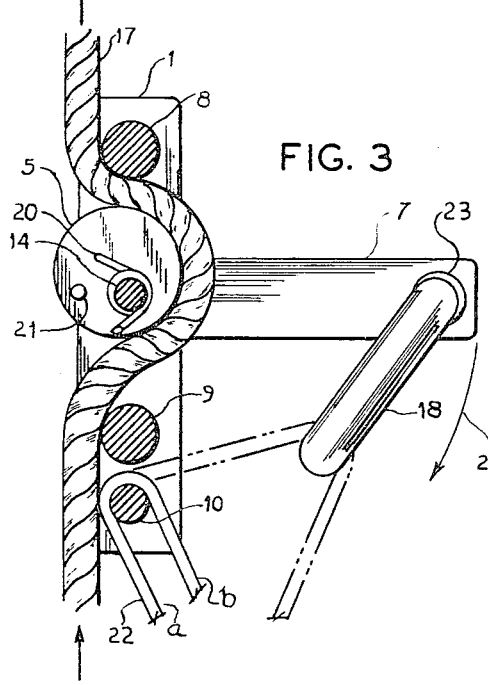

In FIGURE 3 and FIGURE 4, levers 7 and 7' are secured to cam 5 and cam 6 respectively by pins 21 and 21'. The cams are eccentrically pivoted on studs 14 and 14' respectively.

Spring 20 provides a force which causes lever 7 and cam 5 to be rotated in the direction indicated by arrow 26. Cam 6 of FIGURE 4 is similarly biased by a spring, not shown.

To replace any post or stud, remove its respective pin 15 and drive out by placing a drift punch through hole 24.

The following explanation is for rappeling or descending on a rope or line:

The device in FIGURE 1 may be used with one or two ropes or lines, reference 17, threaded under post 8, over cam 5 and under post 9 as shown in FIGURE 3. For one rope or line operation, thread rope or line over one of the cam portions or halves 5a or 5b. For two rope or line operation, thread one rope or line over cam portion 5a and one rope or line over cam portion 5b. Ropes or lines are threaded over post 8 and 9 as explained above. FIGURE 2 is used with only one rope or line and is threaded under post 12, over cam 6 and under post 11 as shown in reference to FIGURE 3.

FIGURE 3 shows a loop strap 22 of which one end is placed over post 10 and the other end secured by some means determined by operator using the device.

FIGURE 4 shows a loop strap 22' of which one end is placed in a snap type ring 19, secured to side 3 through hole 16 and the opposite end secured by some means determined by operator using device.

Snap type rings 18 and 18', in FIGURES 3 and 4 are used as a handle and by the operator moving levers 7 and 7' in the direction indicated by arrows 26. Cam 5 of FIGURE 3 pivots on stud 14 to cause pressure on rope or line 17, thereby regulating speed of decent or stopping decent entirely. Cam 6 of FIGURE 4 is similarly controlled.

The following explanation is for ascending a rope or line:

The device shown in FIGURE 1, when used in pairs, is a mechanical means of ascending a double or single rope or line. By threading rope or line 17 under post 8 and over cam 5a and 5b for double rope or line, or over cam 5a or 5b for single rope or line, and with loop strap 22, side a, as shown, and side b placed through snap type ring 18 as shown in phantom. With exerting pressure on opposite end of loop strap, the strap causes lever 7 to move in direction indicated by arrow 26, thus causing cam 5 to pivot on stud 14, which results in a positive clamp on rope or line 17.

The device shown in FIGURE 2 when used in pairs or with one device shown in FIGURE 1, is a mechanical means of ascending a single rope or line. By threading rope or line 17' under post 12 and over cam 6 and with loop strap 22', side a, as shown, and side b placed through snap type ring 19, as shown in phantom. With exerting pressure on opposite end of loop strap, the strap causes lever 7' to move in direction indicated by arrow 26, thus causing cam 6 to pivot on stud 14' which results in a positive clamp on rope or line 17'.

While I have here shown and described a preferred embodiment of my invention, it will be apparent however that this invention is not limited to this embodiment and that many changes, additions and modifications can be made in connection therewith without departing from the spirit and scope of the invention as herein disclosed and hereinafter claimed.

Having described my invention what I claim as new and desire to secure by latters patent is:

1. A mechanical safety device for use with nonmetal rope comprising:
    first and second parallel side rails;
    first and second nonrotating parallel posts transverse to and interconnecting said side rails;
    a stud member anchored in said first side rail and passing through said second side rail parallel to and spaced intermediate said first and second posts;
    an eccentrically-pivoted cam member rotatively mounted on said stud member adapted on rotation to exert a clamping action on a rope threaded between said cam and said first post;
    connecting means secured to an end of at least one of said side rails; and
    a lever secured to said cam member to pivot said cam member and impose a clamping action in cooperation with said first post in response to movement of said lever away from said first post and towards said connecting means.

2. A mechanical safety device as claimed in claim 1 including:
    a spring device connected between said cam member and one of said first and second side rails to resiliently bias said cam member in a clamping direction towards said first post.

3. A mechanical safety device as claimed in claim 1 wherein:
   said first and second posts are securely anchored to said first side rail and set in freely separable blind recesses in said second rail; and
   said stub member secured anchored to said first rail and extending through said second rail and beyond a sufficient extent to permit said second side rail to be disconnected from said posts while remaining connected to said stub member.

4. A mechanical safety device as claimed in claim 3 including:
   pin means laterally restraining said cam on said stud member independently of said disconnectable second side rail.

References Cited

UNITED STATES PATENTS

| 230,435 | 7/1880 | Pitney | 24—134 |
| 394,109 | 12/1888 | Fowler | 188—65.5 X |
| 512,730 | 1/1894 | Luedecke. | |
| 896,241 | 8/1908 | Pike | 188—65.5 X |
| 2,942,315 | 6/1960 | Johnson | 24—134 |

FOREIGN PATENTS

| 605,409 | 5/1926 | France. |
| 11,765 | 6/1899 | Great Britain. |
| 631,984 | 11/1949 | Great Britain. |

BERNARD A. GELAK, *Primary Examiner.*